United States Patent [19]

Aragon et al.

[11] Patent Number: 5,572,007
[45] Date of Patent: Nov. 5, 1996

[54] SYMBOLOGY READER WITH INTERCHANGEABLE WINDOW

[75] Inventors: Joel T. Aragon, Everett; Steven M. Bunce, Mill Creek, both of Wash.

[73] Assignee: Intermec Corporation, Everett, Wash.

[21] Appl. No.: 293,386

[22] Filed: Aug. 19, 1994

[51] Int. Cl.$^6$ ..................................................... G06K 7/10
[52] U.S. Cl. ........................................... 235/472; 235/462
[58] Field of Search ................................... 359/827, 882, 359/884, 885; 235/462, 472, 454, 467

[56] References Cited

U.S. PATENT DOCUMENTS

| | | | |
|---|---|---|---|
| 4,621,189 | 11/1986 | Kumar et al. | 235/472 |
| 4,971,410 | 11/1990 | Wike, Jr. et al. | 235/467 |
| 4,983,818 | 1/1991 | Knowles | 235/472 |
| 5,288,984 | 2/1994 | Ito et al. | 235/472 |
| 5,371,348 | 12/1994 | Kumar et al. | 235/472 |
| 5,410,141 | 4/1995 | Koenck et al. | 235/472 |

FOREIGN PATENT DOCUMENTS

| | | | |
|---|---|---|---|
| 61-34681 | 2/1986 | Japan | 235/472 |
| 0147577 | 7/1987 | Japan | 235/472 |
| 0144681 | 6/1990 | Japan | 235/472 |
| 3248287 | 11/1991 | Japan | 235/472 |
| 4149790 | 5/1992 | Japan | 235/472 |
| 4233089 | 8/1992 | Japan | 235/472 |

*Primary Examiner*—Donald T. Hajec
*Assistant Examiner*—Thien Minh Le
*Attorney, Agent, or Firm*—Seed and Berry LLP

[57] ABSTRACT

A symbology reader having a replaceable window element. The window element is user replaceable and incorporates varying features for varying applications. By removing and replacing a window element, the user may provide a clear, uncontaminated surface through which light may enter or exit the reader. In some embodiments, the window element includes focusing elements for defining a target plane for a detector assembly within the reader. In one such embodiment, the reader also includes additional focusing elements for focusing spotter beams to aid a user in aligning the reader to the defined target plane. The window element also incorporates polarizers and color selected filters for optimizing the reader for specific applications. In one embodiment, the reader includes a protective rubber boot to provide shock protection and to releasably retain the window element in attachment to the reader. In an alternative embodiment, the reader includes a releasable tab to hold the window element in position on the reader.

31 Claims, 6 Drawing Sheets

SYMBOLOGY READER WITH INTERCHANGEABLE WINDOW

TECHNICAL FIELD

The present invention relates to symbology readers and, more particularly, to windows for symbology readers.

BACKGROUND OF THE INVENTION

Symbology readers utilize transmitted and reflected light to read symbologies of various kinds. For example, such symbologies may be linear symbologies such as bar codes, or may be multirow or stacked symbologies, such as PDF-417 or Code 49, or multilayer codes. Such symbologies may also include other types, such as "area" symbologies having a matrix of data cells, rather than one or more rows of bars and spaces.

Typically, light is generated by a light source, such as a laser or light emitting diode ("LED") within the reader. The light from the source is directed outwardly through a reader aperture in the reader toward a target object bearing the symbology. Light from the reader aperture strikes the symbology and is reflected. Because the symbology is a pattern of varying reflectances, light is reflected in a pattern corresponding to the reflectance pattern of the symbology. Light reflected from the symbology travels back to the symbology reader where it enters the reader through the aperture. There the reflected light is detected by an optical detector such as a CCD array within the reader. The detector generates an electrical signal corresponding to the pattern of reflectivity of the symbology. This electrical signal is then decoded by a microprocessor and conventional electronics in the reader to determine the information represented by the symbology.

The reader aperture often includes a transparent or color selective plate or window through which the light passes as it travels to and from the symbology. The window protects the interior of the reader from contaminants, such as dirt and moisture. Where the window is color selective, it also acts as a filter to remove light at undesirable wavelengths to improve the operation of the detector.

Ideally, the window transmits light unaffected at the wavelength at which the detector operates. While this may be realized by a clean, transparent or color selective plastic or glass window, such windows often become contaminated or damaged during use. Most commonly, the windows become scratched as the reader is used in the field or contaminants become stuck to an outer surface of the window.

When the window becomes scratched or contaminated, its effectiveness at transmitting light becomes impaired. In some cases, the damage or contamination causes light to be absorbed or reflected. Even where the light is transmitted, it may be diffused or redirected, causing light to miss the detector, or to strike the detector improperly. This problem is especially significant in an area detector type of reader such as a CCD array, where redirected light may strike an improper region of the detector. Such misdirected light can cause the detector to incorrectly indicate the relative reflectances of regions of the symbology, thereby causing the reader to fail to decode the symbology or to decode the symbology incorrectly.

In conventional readers, damage or contamination to the window typically involves replacement of the window. Many times it typically requires the reader to be partially disassembled to remove the window and insert a replacement window. Often this forces the reader to be out of service for an undesirably long period of time. In some cases, it may even involve returning the reader to a service facility.

Another problem encountered with conventional readers is that in some applications the optical properties of the window may be inappropriate for a given application. For example, where a reader is typically used outside in bright light, it may employ a window having a strong filter to reduce the impact of incident light. When the reader is taken to a lower light environment, such as inside of a building, the filter becomes unnecessary and will actually reduce the overall sensitivity of the reader.

In some uses, it may also be desirable to have a symbology reader with a changeable focal plane. For example, where symbologies are readily accessible, such as on small, easily manipulated packages, a short focal length may be advantageous. Where the same reader is used in a less localized application, for example, to inventory large, relatively inaccessible packages in a warehouse, a much longer focal length is advantageous to permit symbologies to be read at a greater distance.

The windows of typical symbology readers are not easily and quickly replaceable, and are not designed with a range of optical properties. Such windows also prevent access to the optics within the reader, making adjustments or adaptations difficult.

SUMMARY OF THE INVENTION

A user replaceable window for a symbology reader having a reading face with an optical aperture therethrough is described. The reader includes a releasable window retainer positioned adjacent an edge of the reader aperture. The window comprises an optically transmissive base for attachment to the reader at its reader face. The base conforming substantially to the reading, an alignment guide for retaining the window in alignment with the aperture, and a region adapted for engaging the window retainer to releasably hold the window in attachment to the reader. The window also includes a compressible gasket positionable intermediate the base and the reader to provide a seal therebetween. The gasket has a light transmissive region corresponding to the optical aperture.

In one embodiment, the window also includes a focusing element supported by the base. The focusing element is formed integrally with the base and includes a first region having a first index of refraction and a second region having a second index of refraction different from the first index of refraction and integral to the base.

The window also includes a pair of crossed polarizers, the first polarizer being supported by the base and transmitting light of a first polarization and the second polarizer supported by the base and transmitting light of a second polarization substantially orthogonal to the first polarization. The polarizers are formed from laminar films overlaying a portion of the base.

A symbology reader is also described, the symbology reader including a reader housing having a reading face with an optical aperture therethrough and a user removable first window including a first optically transmissive base attachable to the housing at a mounting location on the reader face. The symbology reader also includes a user removable second window including a second optically transmissive base attachable to the housing at the mounting location, the second and first windows being interchangeably attachable to the housing at the mounting location. The reader also includes a user releasable window retainer attached to the housing at the reader face and releasably retaining either of the first or second windows in attachment with the reader at the mounting location. In one embodiment, the first window includes a first focusing element having a first focal length and the second window includes a second focusing element having a second focal length different from the first focal length, each of the first and second focusing elements being supported by the base.

In one embodiment, the first focusing element includes a first region of a first base having a first index of refraction and a second region of the first base having a second index of refraction differing from the index of refraction of the first region. The reader also includes a spotter beam source mounted to the reader housing for producing a first spotter beam of visible light directed through the optical aperture, and a first optical element supported by the first base for directing the first spotter beam along a selected first path toward a target plane. The reader also includes a second optical element supported by the second base for directing the first spotter beam along a second optical path toward the target plane, the second optical path being different from the first optical path.

In one embodiment, the reader also includes a second spotter beam source mounted to the reader housing for producing a second spotter beam of visible light directed through the optical aperture, and a second optical element for directing the second spotter beam along a second optical path toward the target plane.

In one embodiment, each of the first and second windows has a corresponding transmissivity, the transmissivity of the first window differing from the transmissivity of the second window. In one embodiment, the first window includes a first optical filter for selectively transmitting light of a first wavelength and the second window includes a second optical filter for selectively transmitting light of a second wavelength, the first wavelength differing from the second wavelength.

The reader also includes a flexible boot engaging the reader face at its perimeter, the boot including a lip extending to overlay an edge portion of the first or second windows.

DETAILED DESCRIPTION OF THE INVENTION

Figure 1:
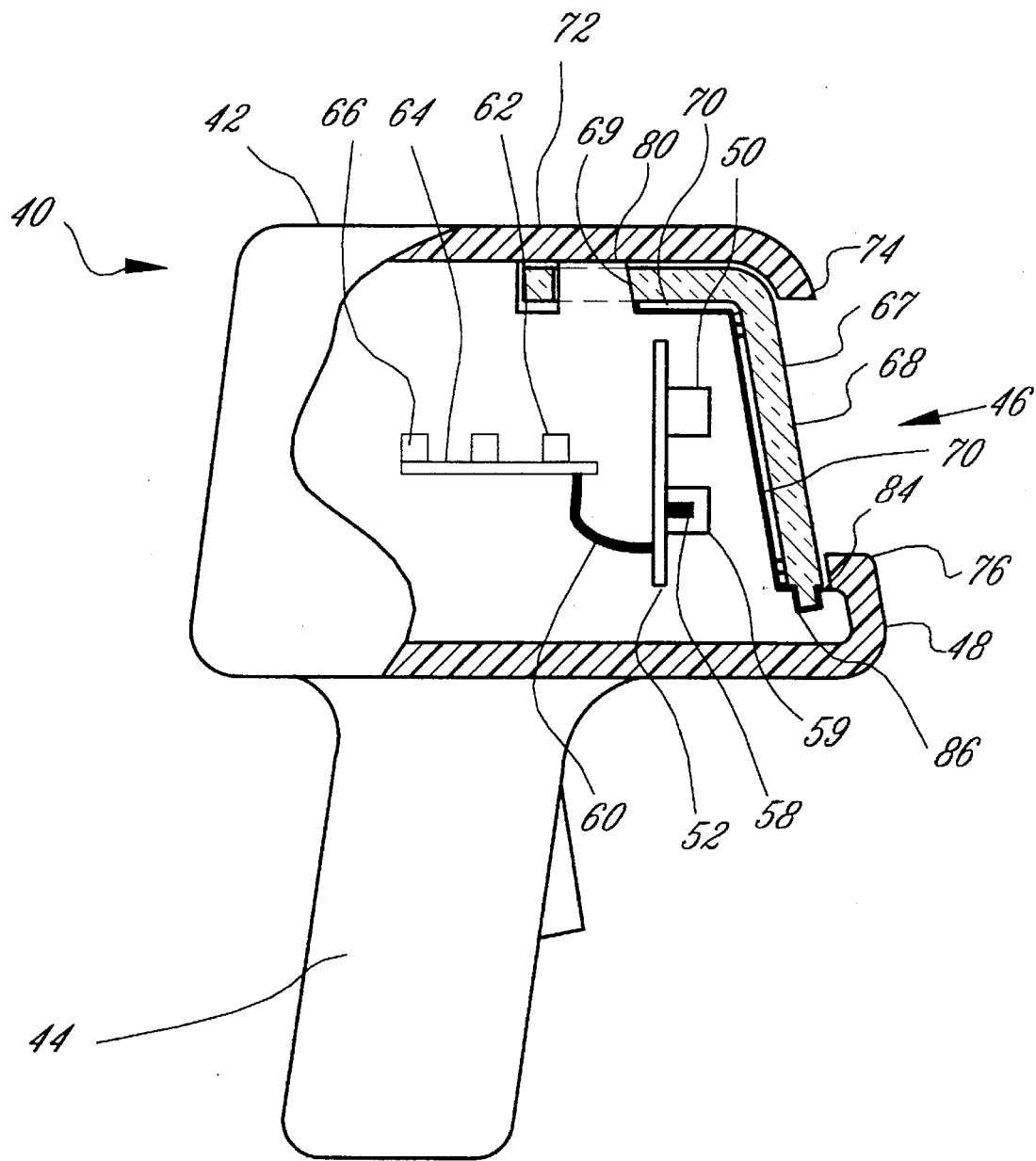
FIG. 1 is a partial cross-sectional, side elevational view of a symbology reader including a window according to the present invention.
Figure 2:
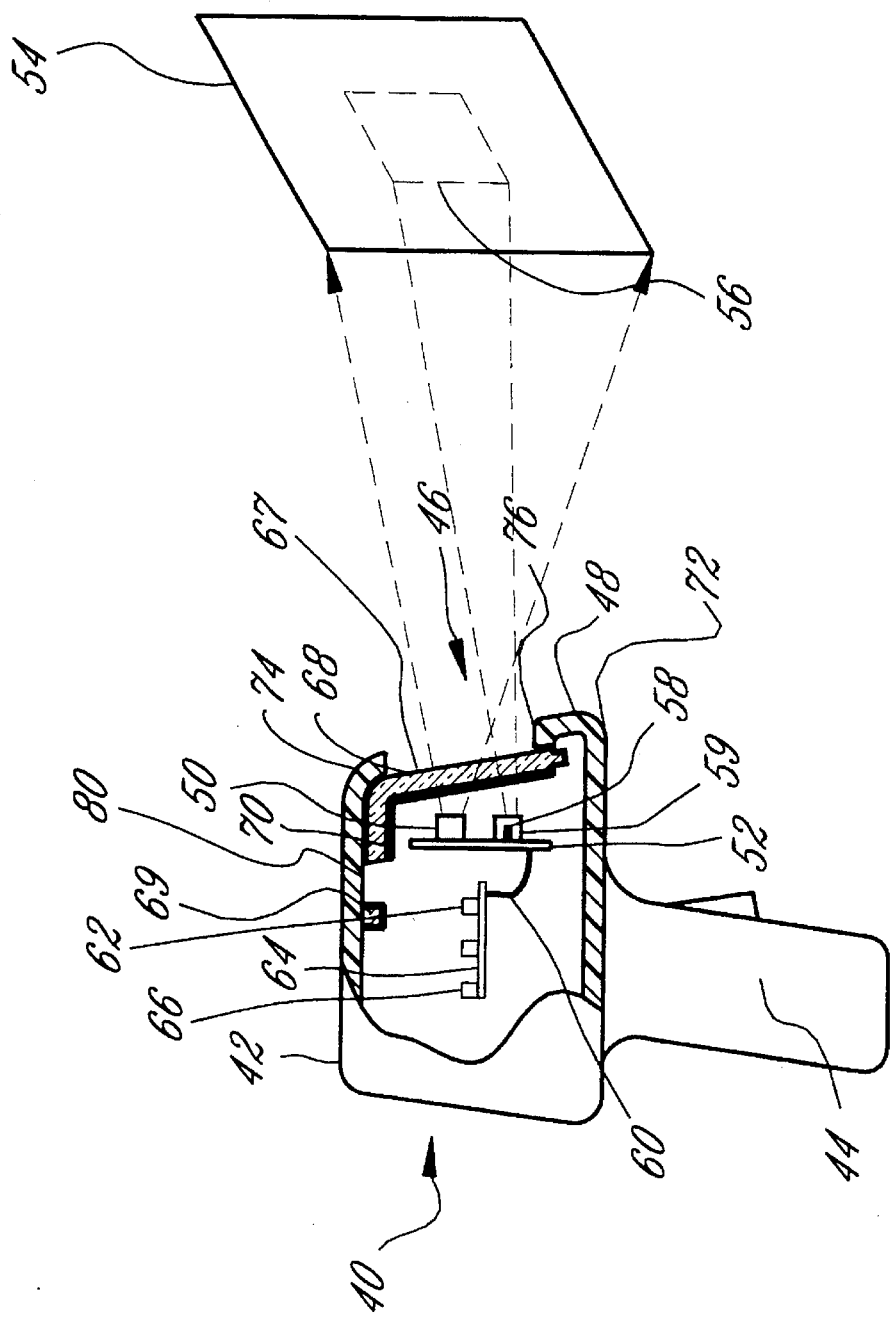
FIG. 2 is a reduced scale, partial cross section, side elevational view of the reader of FIG. 1 with a diagrammatic representation of a symbology being read.

For purposes of illustration, the present invention is shown embodied in a symbology reader 40 having a head 42 and a handle 44. As best shown in FIGS. 1 and 2, the head 42 has a reader aperture 46 in a reading face 48 thereof to provide a passageway for light to enter or exit the head.

An illumination source 50 is mounted to a printed circuit board 52 within the head 42 and is oriented to emit light outwardly through the reader aperture 46. The illumination source 50 may be a laser diode, an LED, or an array of LEDs. As shown in FIG. 2, light from the illumination source 50 exits the head 42 through the reader aperture 46 and illuminates a target object 54 bearing a symbology 56, as indicated by the broken line arrows. The symbology 56 is a pattern of regions of varying reflectance that reflects some of the light from the illumination source 50 back toward the reading face 48. Several types of symbologies are known. Examples include linear symbologies, such as bar codes, or may be multirow symbologies, such as PDF-417 or Code 49, or multilayer symbologies. Symbologies may also be of other types, such as "area" symbologies having a matrix of data cells.

The light reflected by the symbology 56 enters the head 42 through the reader aperture 46 and is detected by an optical detector 58 of a detector assembly 59. The detector assembly 59 is a cylindrical housing holding optical elements such as focusing optics, apertures and filters.

Because the symbology 56 is a pattern of regions of differing reflectance, the reflected light received by the detector assembly 59 will correspond to the pattern of reflectances of the symbology 56 and will be focused upon the optical detector 58 by the detector assembly 59.

The optical detector 58, upon detecting the light reflected from the symbology 56, generates an electrical signal which is carried by a cable 60 to a microprocessor 62 on a controller printed circuit board 64 within the head 42. The microprocessor 62, in conjunction with conventional electronics 66 on the printed circuit board 64 decodes the electrical signal from the optical detector 58 to determine information represented by the symbology 56.

A window 68 advantageously covers the reader aperture 46 to protect the devices mounted within the head 42 and to prevent contamination. The window 68 is an optically transmissive plate which mounts to the head 42 at the reading face 48. A substantially planar portion 67 covers the reader aperture 46. An upper portion 69 of the window extends rearwardly from an upper edge of the planar portion 67 to generally parallel an upper surface of the head 42. The planar portion 67 and upper portion 69 define a curvature conforming substantially to the reading face 48. A window slot 78 (best seen in FIG. 3) in the upper portion 69 is positioned and sized to accept a retaining tab 80 which projects upwardly from the head 42. The window slot 78 is a rectangular slot through the upper portion 69 and centered between the left and right edges thereof.

A gasket 70 is seated between the window 68 and the head 42 to provide a seal to minimize the entry of moisture and contaminants into the head 42 through the reader aperture 46. The window 68 is manufactured of a transparent acrylic, though other window materials, such as common transparent window plastic, are within the scope of the invention. The gasket 70 is a compliant member, such as a foam rubber sheet, a silicone seal, or molded rubber. In the preferred embodiment, the gasket includes ribs (not shown) along one or both faces thereof to provide an improved seal against contaminants such as water.

A boot 72, preferably of rubber, covers part of the head 42. The boot 72 has a pair of front lips 74, 76 which extend over edge regions of the window 68, helping to hold the window 68 in place and providing some physical shock protection. While the boot 72 is preferred, the boot may be eliminated in some applications, such as applications where little risk of physical impact is present.

To attach the window 68 to the head 42, a user aligns the window gasket 70 with the reader aperture 46 such that a central opening 82 in the gasket 70 is aligned with the reader aperture 46. The gasket 70 is then positioned in contact with the head 42. The window 68 is aligned to the gasket 70 and the slot 78 is placed over the tab 80 by sliding the window 68 downwardly to place a ridge 84 at a lower end of the window 68 in a ridge slot 86 to guide the window 68 into its mounted position. As the window 68 is slid into place, the retaining tab 80 enters into the window slot 78. Together the combination of ridge and ridge slot and tab and window slot hold the window 68 in place, with movement permitted only in an upward direction relative to the head 42. The boot 72 is then repositioned to cover the edges of the window 68, preventing it from sliding upwardly.

To remove the window 68, the user follows the opposite procedure. The user peels away the boot 72 by flexing it to disengage the lips 74, 76 from the window 68. The window 68 can then be slid upwardly to disengage the window slot 78 from the retaining tab 80 and to disengage the ridge 84 from the ridge slot 86. The window 68 is then free from the head 42.

Figure 3:
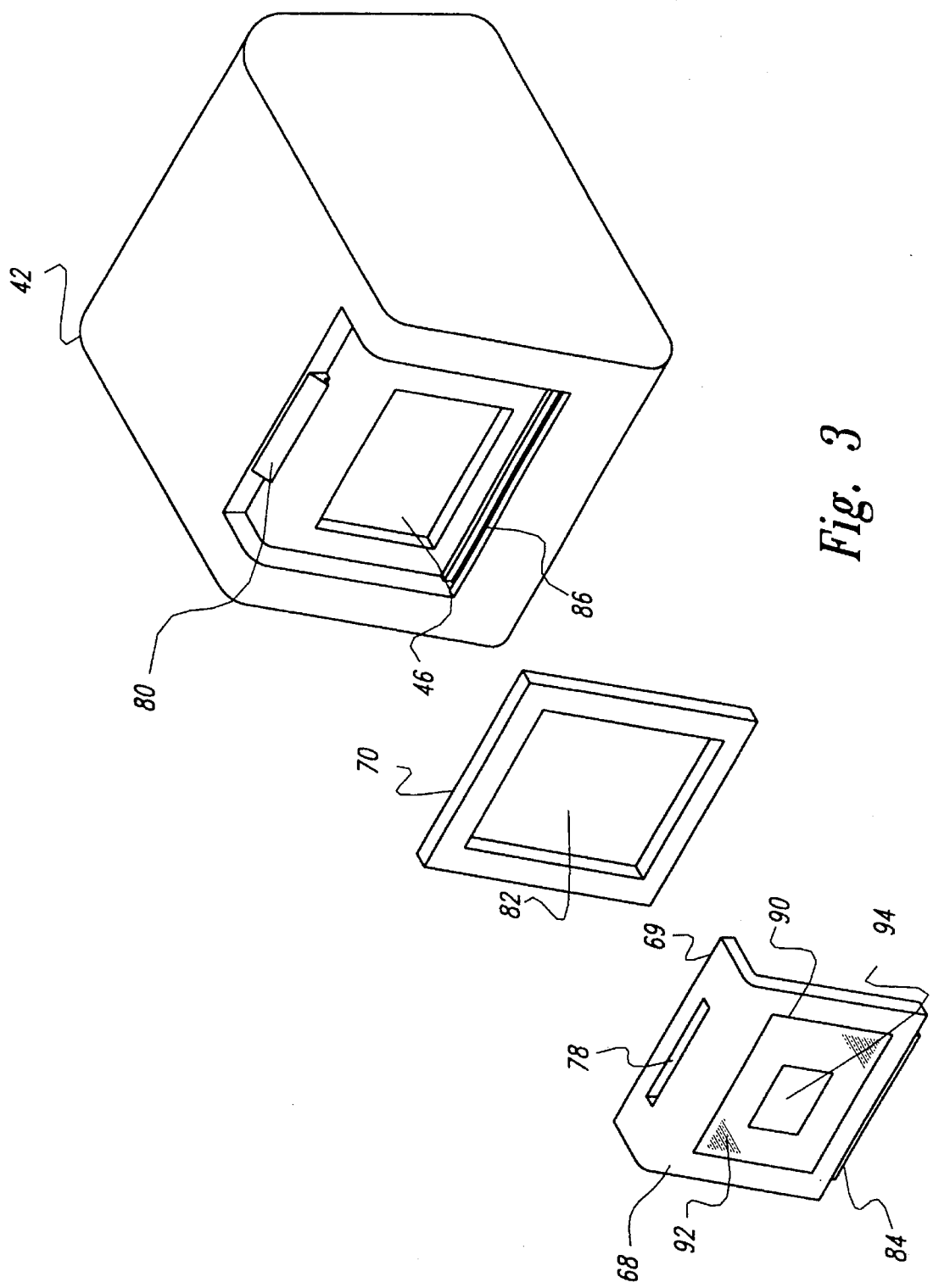
FIG. 3 is an exploded isometric view of a head portion of an alternative embodiment of the reader of FIG. 1 partially disassembled.

FIG. 3 shows the head 42 of an alternative embodiment of the reader 40 with the window 68 and the gasket 70 removed. The window slot 78 in an upper section of the window 68 is shaped to accept the flexible retaining tab 80 formed integrally to the head 42 (see also FIG. 4). Note that in the partially disassembled view of FIG. 3, the boot 72 is removed to more clearly show the correspondence of the gasket 70, and the head 42.

Figure 4:
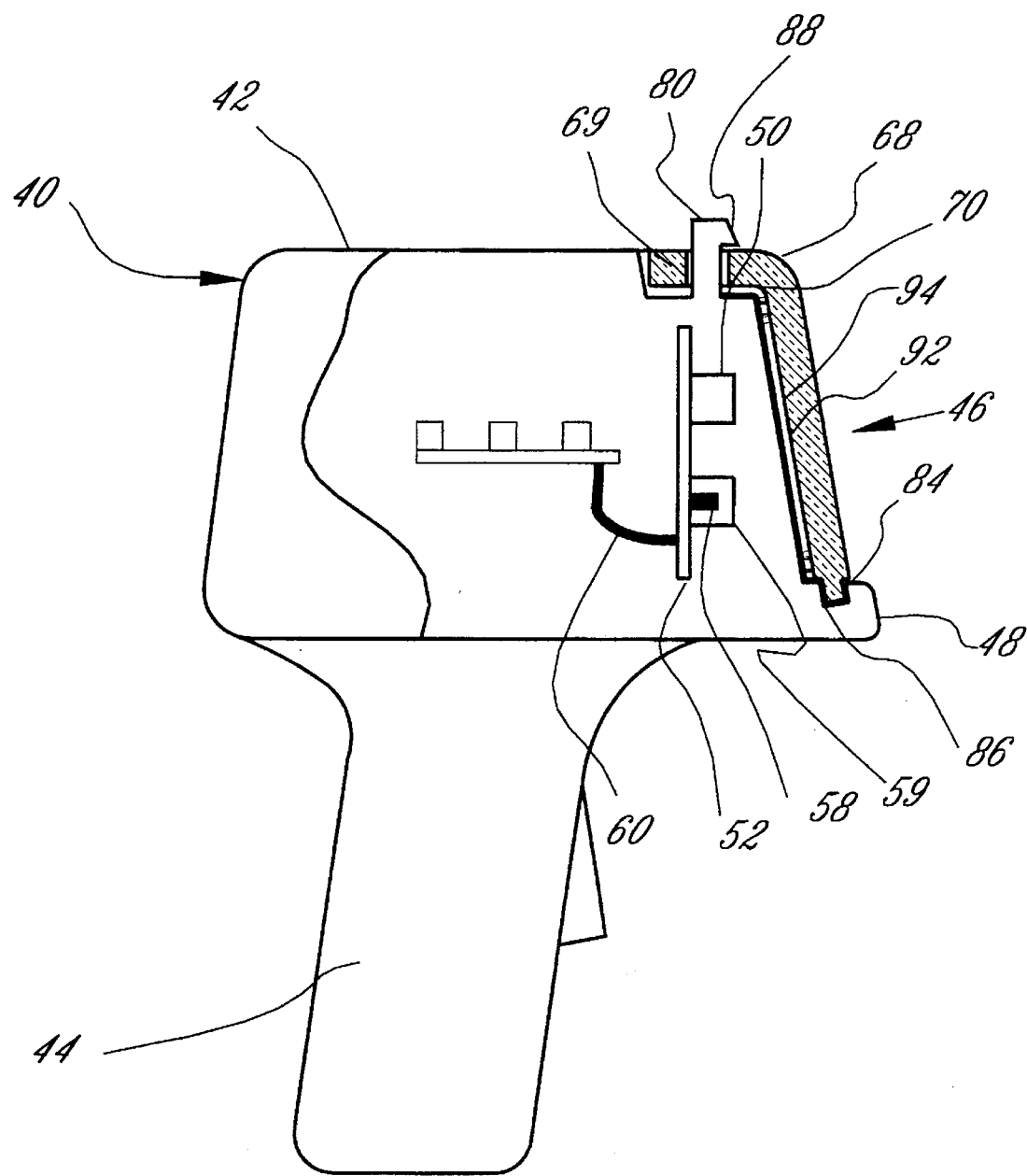
FIG. 4 is a partial cross-sectional, side elevational view of the reader of FIG. 3 with the window and gasket mounted in place.

In the embodiment of FIGS. 3 and 4, the retaining tab 80 differs from that described with respect to FIGS. 1 and 2. The tab 80 includes a lip 88 which extends forward over the window 68 to hold the window in place when the ridge 84 is in the ridge slot 86.

To remove the window 68 in this embodiment, the user simply bends the tab 80 rearwardly with his finger sufficiently to release the engagement of the lip 88 from the window 68 and position the lip to pass through the window slot 78. The window can then be lifted upwardly to withdraw the ridge 84 from the ridge slot 86, freeing the window from the head 42.

The reverse procedure is followed to attach the window 68. The window 68 is aligned to the reader aperture 46 with the ridge 84 above the ridge slot 86 and the gasket 70 between the window 68 and the head 42. The window 68 is slid downwardly such that the ridge 84 enters the ridge slot 86 and the hooked tab 80 enters the window slot 78. The tab 80 is bent back to allow the lip 88 to pass through the window slot 78. When the lip 78 passes all the way through the window slot 78, the tab 80 is free to return to its unflexed position and the lip 88 projects forwardly to hold the window 68 in place.

Other means for attaching the window to the reader 40 are within the scope of the invention. For example, a mechanical clasp, a connector or other types of fastener may lock the window 68 to the head 42 of the reader 40. The lip 88 on the tab 80 eliminates the need for the boot 72 to hold the window 68 in its mounted position. Where the hooked tab structure of FIGS. 3 and 4 is used to hold the window 68 in place, the boot 72 can still be used for shock resistance; but, may be eliminated to ease detachment of the window.

As can best be seen in FIG. 3, the window 68 includes a polarizer 90 having a first region 92 and a second region 94. The first region 92 transmits light of a first polarization and the second region 94 transmits light of a second polarization, orthogonal to the first polarization. The polarizer 90 is formed from laminar sheets of polarizing material bonded to the planar portion 67 of the window. Alternatively, the polarizer 90 may be formed integrally to the planar portion 67, in a known fashion.

As can be seen in FIG. 4, the second region 94 is positioned to receive light from the illumination source 50 while the first region 92 is positioned to receive reflected light traveling toward the detector assembly 59. Such orthogonal polarizers can be useful for eliminating the effects of specular reflection.

Figure 5A:
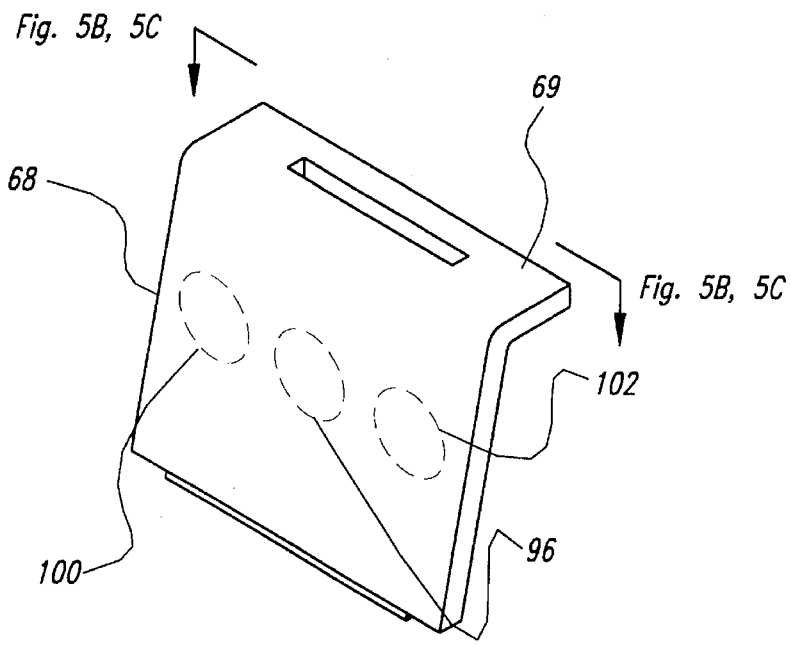
FIG. 5A is an isometric view of an alternative window having a focusing element and two spotter beam lenses and usable with the reader embodiments of FIGS. 1 and 3.
Figures 5B, 5C:
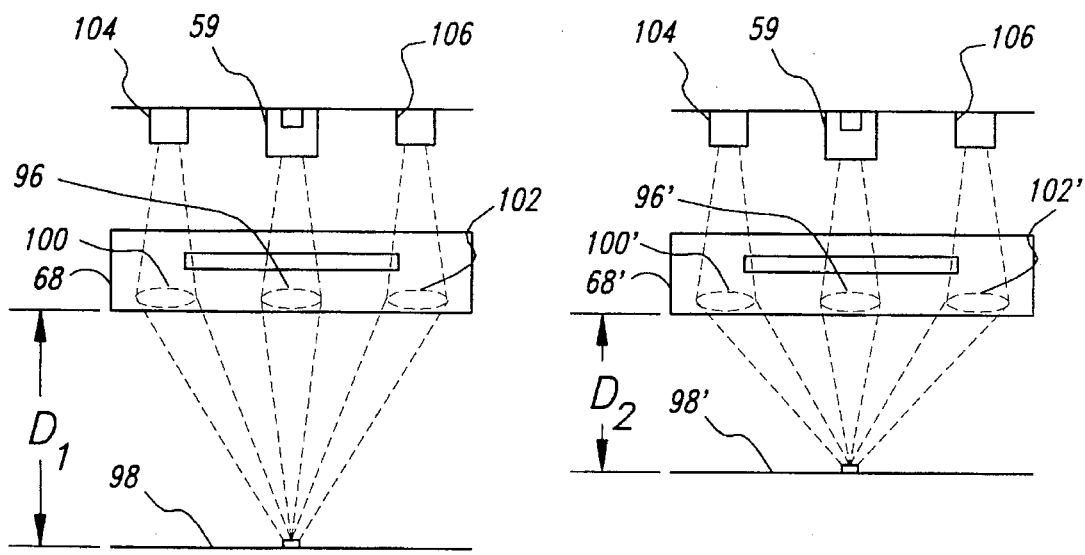
FIG. 5B is a top plan view of the window of FIG. 5A constructed with a long reader-to-target plane distance.
FIG. 5C is a top plan view of the window of FIG. 5A constructed with a short reader-to-target plane distance.

In another embodiment of the window 68 shown in FIG. 5A, the window includes a focusing element 96 positioned to be aligned to the detector assembly 59 when the window is mounted to the reader 40, as is illustrated in FIGS. 5B and 5C. The focusing element 96 is a lens, formed integral with the window 68. Such lenses can be formed by varying the index of refraction of the window material, or by varying the thickness of the window 68 in a known fashion.

As can be seen in FIG. 5B, the focusing element 96 in conjunction with focusing elements in the detector assembly 59 define a target plane 98 at a distance $d_1$ from the front face of the window 68. Advantageously, the window 68 may be replaced by an alternate window 68' having a focusing element 96' of a different focal length, as shown in FIG. 5C. The focusing element 96', together with the focusing elements in the detector assembly 59, defines a target plane 98' at a distance $d_2$, less than the distance $d_1$.

The windows 68, 68' of FIGS. 5B and 5C also include a pair of targeting lenses 100, 102 formed integral with the window 68. The targeting lenses 100, 102 cooperate with a pair of spotter beam sources 104, 106 shown in FIGS. 5B and 5C to provide a pair of spotter beams forming a pair of cursor images on a target object indicating to a user that the target object is aligned with the target plane 98 and the detector assembly 59 is aligned to read the symbology. The two spotter beam system of FIG. 5B utilizes the intersection or other placement of the cursor images on the target object to indicate that the reader 40 is at the proper distance d from the target plane 98.

The alternate window 68' also includes a pair of targeting lenses 100', 102' having different focal lengths than the targeting lenses 100, 102 of FIG. 5B. The focal lengths of the targeting lenses 100', 102' of the alternate window 68' are chosen to cooperate with the pair of spotter beam sources 104, 106 to provide a pair of spotter beams to produce a pair of cursor images on a target object to indicate to the user that the reader 40 is aligned with the alternate target plane 98' and the detector assembly 59 is aligned to read the symbology in the alternate target plane 98'.

It can be seen that by interchanging the windows 68 and 68', the target planes 98, 98' of the reader 40 may be defined for the detector assembly 59 simultaneously with alignment of the spotter beams to indicate the defined target plane 98 or 98'. A user may thus adapt the reader 40 for use with target objects positioned close to the reader or for use with target objects to be read from a greater distance, simply by interchanging the replaceable windows 68, 68'.

While the focusing elements 96, 96' and the targeting lenses 100, 102, 100', 102' are shown as being formed integral with the window 68, it will be understood that the definition of the target plane 98 the focusing of the spotter beams may be achieved with a variety of focusing elements. For example, lenses may be surface mounted on the inner or outer surface of the window 68. Also, segmented or gradient surfaces, such as Fresnel lenses or pyramidal structures, may be incorporated into or onto the window 68. Moreover, where the detector assembly 59 is chosen with a sufficient depth of field, or where the focusing of the optics within the detector assembly is adjustable, the focusing element 96 may be eliminated.

The window 68 also permits the reader 40 to be adapted for a variety of applications. For example, the window 68 may include a color selective filter integral to the window to filter out light at a wavelength other than the wavelength of the illumination source 50. This permits the reader's sensitivity to be improved, especially in high ambient light conditions.

For example, in those applications where ambient light is very high, the color selective filter may be made highly color selective, strongly blocking light at other wavelengths. On the other hand, where ambient light is at a very low level, the window 68 may be substantially transparent to all wavelengths to permit the detector to receive more light.

Figure 6:
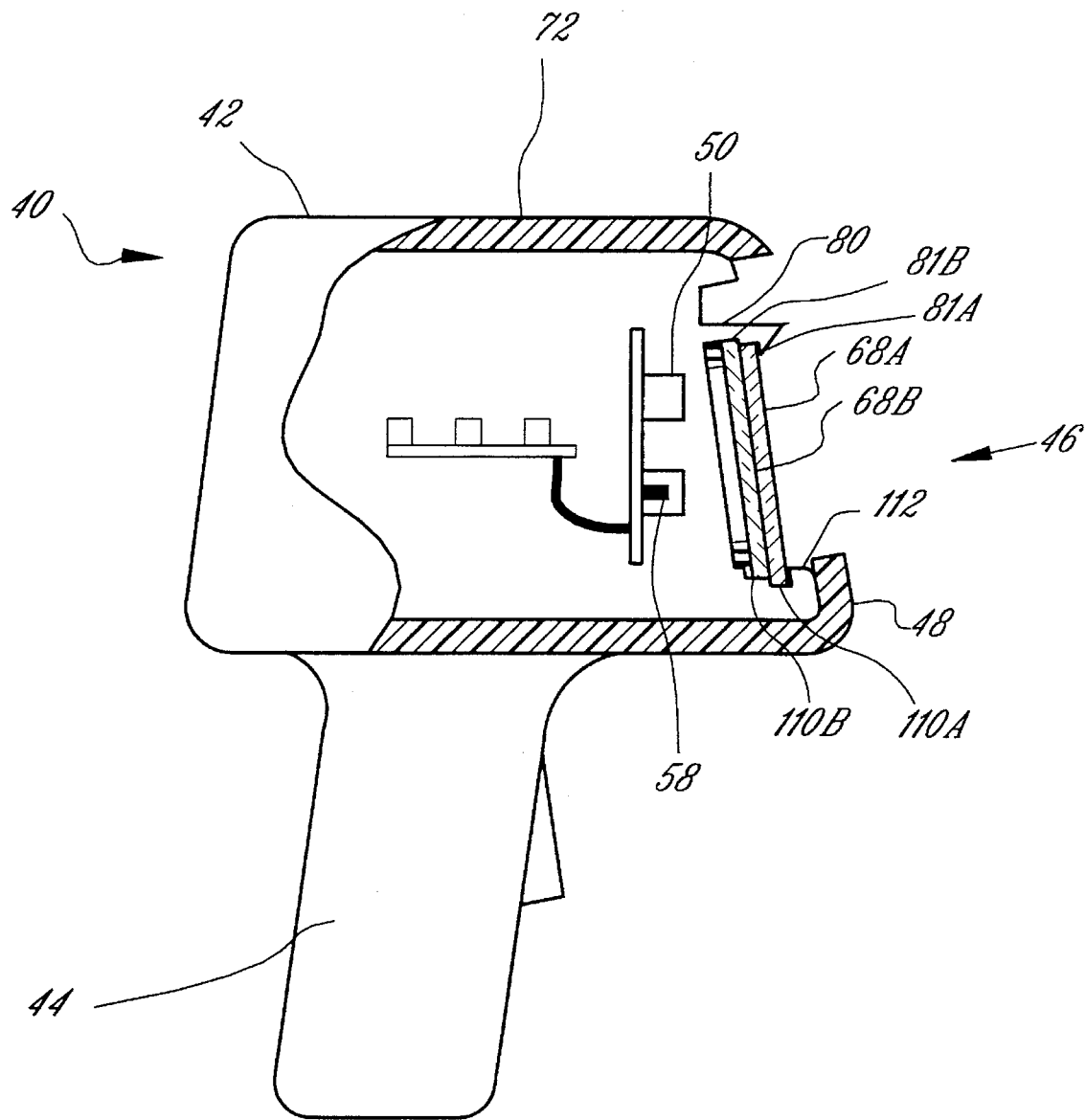
FIG. 6 is a side cross-sectional view of an alternative embodiment having multiple window sheets.

The embodiment shown in FIG. 6 permits the optical effects of the window 68 to be varied through the use of multiple window sheets. In this embodiment, two separate window sheets 68A and 68B are mounted to the head 42, with the window sheet 68A overlaying the window sheet 68B. The window sheets 68A, 68B are held in place by a flexible tab 80 having a pair of lips 81A, 81B which engage the upper edges of the window sheets 68A, 68B, respectively. The lower ends of the window sheets 68A, 68B rest upon respective shelves 110A, 110B and are held in place by a lip 112 which engages window sheet 68A.

The use of multiple window sheets 68A, 68B allows the color selectivity and/or transmissivity of the overall window 68 to be varied by a user. For example, if window sheet 68A is selected with a transmissivity of 75% and window sheet 68B is selected with a transmissivity of 50% the overall transmissivity would be 37.5%. If window sheet 68A is removed, leaving only window sheet 68B, the transmissivity would be 50%. If only window sheet 68A is used the transmissivity would be 75%. If neither window sheet 68A or 68B is used, the transmissivity would be 100%. Thus, four different levels of transmissivity can be obtained with only two window sheets 68A, 68B.

It can be seen that additional flexibility can be gained with more than two window sheets, even if only two window sheets can be mounted to the head 42 at any one time. For example, window sheet 68A could be replaced by a third window sheet (not shown) having a transmissivity of 25% giving a total transmissivity of 12.5% for the combination of this third window sheet and window sheet 68B. The third window sheet could also be substituted for the window sheet 68B. If the head is adapted to hold all three window sheets, even greater flexibility can be achieved. While multiple window sheets have been described in terms of varying transmissivity, window sheets 68A and 68B may vary in ways other than transmissivity. For example, each of the window sheets 68A, 68B may block light at selected wavelengths or polarizations to help block unwanted light having specific optical characteristics. In fact, several window sheets can be carried with the symbology reader to improve adaptability for a variety of applications.

Where symbologies having different optical characteristics such as different colors are used, the window 68 or specific window sheets 68A, 68B may be selected to permit the reader to be optimized for a specific type of symbology. Moreover, in specific environmental applications, the window may be selected to more quickly or effectively adapt to the environment. For example, in cold storage applications, condensation on an inner surface of the window is often a problem. The interchangeability of the windows 68, 68' or window sheets 68A, 68B allows the window or window sheet to be removed from the reader 40 to permit a user to clean the inner surface to eliminate condensation. Alternately, a window or window sheet coated with a low condensation coating may be attached to the reader for use in the cold storage application. Such adaptation can be realized using the single window or multiple window sheet embodiments.

It will be appreciated that although specific embodiments of the invention have been described herein for purposes of illustration, various modifications may be made without departing from the spirit and scope of the invention. Accordingly, the invention is not limited except as by the appended claims.

We claim:

1. A user replaceable window for a symbology reader having a reading face with an optical aperture therethrough, the reader having a releasable window retainer positioned adjacent an edge of the reader aperture, comprising:

an optically transmissive base for attachment to the reader at its reading face, the base conforming substantially to the reading face;

an alignment guide for retaining the window in alignment with the aperture; and a region adapted for engaging the window retainer to releasably hold the window in attachment to the reader.

2. The window of claim 1, further comprising:

a compressible gasket positionable intermediate the base and the reader to provide a seal therebetween, the gasket having a light transmissive region corresponding to the optical aperture.

3. The window of claim 1, further including a focusing element supported by the base.

4. The window of claim 3 wherein the focusing element formed integral with the base.

5. The window of claim 4 wherein a first region of the base has a first index of refraction and a second region of the base is a focusing element integral with the base and having a second index of refraction different from the first index of refraction.

6. The window of claim 3 wherein the focusing element is positioned at a forward surface of the base.

7. The window of claim 3 wherein the focusing element is positioned at a rearward surface of the base.

8. The window of claim 1, further including a polarizer for transmitting light of a first polarization supported by the base.

9. The window of claim 8 wherein the polarizer is a laminar film overlaying a portion of the base.

10. The window of claim 1, further including a first polarizer supported by the base and transmitting light of a first polarization and a second polarizer supported by the base and transmitting light of a second polarization substantially orthogonal to the first polarization.

11. The window of claim 1 wherein the base is curved to conform to a curvature of the reader face.

12. The window of claim 1 for use with a window retainer which is a flexible boot, wherein the edge region includes a slot for engaging a corresponding tab on the reader to hold the window in contact with the reader.

13. A symbology reader, comprising:

a reader housing having a reading face;

a user removable first window including a first optically transmissive base attachable to the housing at a mounting location on the reader face;

a user removable second window including a second optically transmissive base attachable to the housing at the mounting location, the second and first windows being interchangeably attachable to the housing at the mounting location; and a user releasable window retainer attached to the housing at the reader face and releasably retaining either of the first or second windows in attachment with the reader at the mounting location.

14. The reader of claim 13 wherein the first window includes a first focusing element having a first focal length supported by the first base.

15. The reader of claim 14 wherein the second window includes a second focusing element supported by the second base, the second focusing element having a second focal length different from the first focal length.

16. The reader of claim 14 wherein the first focusing element is formed integral with the first base.

17. The reader of claim 13 wherein the focusing element is positioned at a forward surface of the base.

18. The reader of claim 13, further including:

a first spotter beam source mounted to the reader housing for producing a first spotter beam of visible light directed outwardly from the reader; and a first optical element supported by the first base for directing the first spotter beam along a selected first path toward a target plane.

19. The reader of claim 18 wherein the first optical element is a lens.

20. The reader of claim 19 wherein the reader includes a second optical element supported by the second base for directing the first spotter beam along a second optical path toward the target plane, the second optical path being different from the first optical path.

21. The reader of claim 18, further including:

a second spotter beam source mounted to the reader housing for producing a second spotter beam of visible light directed outwardly from the reader; and a second optical element for directing a second spotter beam along a second optical path toward the target plane.

22. The reader of claim 13, further including an optical aperture in the reading face wherein the window retainer retains either of the first or second windows in a position overlaying the optical aperture.

23. The reader of claim 13 wherein each of the first and second windows has a corresponding transmissivity, the transmissivity of the first window differing from the transmissivity of the second window.

24. The reader of claim 13 wherein the first window includes a first optical filter for selectively transmitting light of a first wavelength.

25. The reader of claim 24 wherein the second window includes a second optical filter for selectively transmitting light of a second wavelength, the first wavelength differing from the second wavelength.

26. The reader of claim 13 wherein the first window further includes a polarizer for transmitting light of a first polarization.

27. The reader of claim 26 wherein the polarizer is a laminar film overlaying a portion of the first base.

28. A symbology reader, comprising:

a reader housing having a reading face, the reading face having an optical aperture therethrough;

a user removable first window sheet attachable to the housing to overlay a portion of the optical aperture;

a user removable second window sheet attachable to the housing to overlay the first window sheet and the portion of the optical aperture; and a window retainer attached to the housing at the reader face and releasably retaining both of the first and second window sheets in attachment with the reader.

29. The reader of claim 28 wherein the first window sheet has a first transmissivity and the second window sheet has a second transmissivity, the transmissivity of the first window sheet differing from the transmissivity of the second window sheet.

30. The reader of claim 28 wherein the window retainer separately retains each of the first and second window sheets.

31. The reader of claim 28 wherein the window retainer includes:

a first mount sized to hold a selected one of the first and second window sheets in a first position; and a second mount sized to hold a selected one of the first and second window sheets in a second position outward of the first position, wherein the first window sheet and second window sheet are each attachable to the housing by either of the first or second mounts, such that either the first or second window sheet is selectably attachable outward of the other.

* * * * *